United States Patent
Kummeth et al.

(10) Patent No.: US 9,306,441 B2
(45) Date of Patent: Apr. 5, 2016

(54) ELECTRIC MACHINE

(75) Inventors: Peter Kummeth, Herzogenaurach (DE); Heinz Schmidt, Möhrendorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 112 days.

(21) Appl. No.: 14/234,882

(22) PCT Filed: Jul. 20, 2012

(86) PCT No.: PCT/EP2012/064335
§ 371 (c)(1),
(2), (4) Date: Jan. 24, 2014

(87) PCT Pub. No.: WO2013/014100
PCT Pub. Date: Jan. 31, 2013

(65) Prior Publication Data
US 2014/0171330 A1  Jun. 19, 2014

(30) Foreign Application Priority Data
Jul. 25, 2011  (DE) .......................... 10 2011 079 727

(51) Int. Cl.
*H02K 55/00* (2006.01)
*H02P 29/00* (2006.01)
*H02K 55/04* (2006.01)

(52) U.S. Cl.
CPC ................ *H02K 55/00* (2013.01); *H02K 55/04* (2013.01); *H02P 29/005* (2013.01); *H02P 29/0044* (2013.01); *H02P 29/0061* (2013.01); *Y02E 40/625* (2013.01)

(58) Field of Classification Search
CPC ..................... H02K 55/00–55/04; H02K 9/24; H02K 11/00–11/048; G01R 33/3815
See application file for complete search history.

(56) References Cited

U.S. PATENT DOCUMENTS

| | | |
|---|---|---|
| 2003/0052554 A1 | 3/2003 | Mawardi |
| 2006/0166832 A1 | 7/2006 | Izumi |
| 2010/0038986 A1 | 2/2010 | Hull |

FOREIGN PATENT DOCUMENTS

| | | |
|---|---|---|
| DE | 2822421 A1 | 11/1978 |
| DE | 102004040754 A1 | 3/2006 |
| EP | 0508936 A1 | 10/1992 |

*Primary Examiner* — Colleen Dunn
(74) *Attorney, Agent, or Firm* — Henry M. Feiereisen LLC

(57) ABSTRACT

The invention relates to an electric machine (101) comprising a stator (103), a rotatably mounted rotor (105) having a magnetizable and coolable rotor section (107) made of a superconducting material (417), a control unit (109) designed to control a stator flow for inducing a magnetic flow through the superconducting material (417). The invention also relates to a method for operating an electric machine (101).

9 Claims, 2 Drawing Sheets

ELECTRIC MACHINE

CROSS-REFERENCES TO RELATED APPLICATIONS

This application is the U.S. National Stage of International Application No. PCT/EP2012/064335, filed Jul. 20, 2012, which designated the United States and has been published as International Publication No. WO 2013/014100 and which claims the priority of German Patent Application, Serial No. 10 2011 079 727.0 filed Jul. 25, 2011, pursuant to 35 U.S.C. 119(a)-(d).

BACKGROUND OF THE INVENTION

The invention relates to an electric machine and to a method for operating an electric machine.

The use of coils made of a superconducting material in a rotor of an electric machine is known in the art. Thus, the published patent application DE 10 2004 04 754 A1, for example, describes a rectangular coil made of strip-shaped superconductors for use in an electric machine.

As a rule, these superconducting coils must be supplied with an electric current continuously during operation of the electric machine so that they generate a rotor magnetic field in the rotor. If the electric current is switched off, the corresponding rotor magnetic field also disappears.

SUMMARY OF THE INVENTION

The object underlying the invention can therefore be seen as consisting in specifying an electric machine which makes it possible for a rotor magnetic field to be maintained even without a supply of electric current.

The object underlying the invention can also be seen as consisting in specifying a corresponding method for operating an electric machine.

These objects are achieved by means of the respective subject matter of the independent claims. Advantageous embodiments are the subject matter of respective dependent subclaims.

According to one aspect, an electric machine is provided. The electric machine comprises a stator and a rotatably mounted rotor. The rotor has a coolable, magnetizable rotor section made of a superconducting material. A controller is also provided which is designed to control a stator current for inducing a magnetic flux through the superconducting material such that a magnetic flux forms in the superconducting material.

According to a further aspect, a method for operating an electric machine is created, the machine comprising a stator and a rotatably mounted rotor. The rotor has a coolable, magnetizable rotor section made of a superconducting material. A magnetic flux through the superconducting material is formed by controlling a stator current for inducing the magnetic flux in the superconducting material. After the formation of the magnetic flux, the superconducting material is cooled to a temperature below the critical temperature of the superconducting material in order to fix the magnetic flux.

The invention thus encompasses the idea of using the stator current for magnetizing, i.e. forming the magnetic flux of, the magnetizable rotor section. Once the rotor section is magnetized, the superconducting material is cooled to a temperature below the critical temperature. This cooling advantageously causes the magnetic flux in the superconducting material to be fixed. The magnetic flux is, as it were, frozen. The fixing may in particular also be referred to as pinning. The rotor section may in this respect advantageously form in particular a pole of a magnetic field. The critical temperature may also be referred to as a transition temperature and is in particular the temperature below which the electrical resistance of the superconducting material falls to zero ohms.

Even if the stator current is now switched off, the fixed magnetic flux is advantageously retained. In this respect, even when the electric machine is not energized, a rotor magnetic field is advantageously retained.

Furthermore, for magnetization it is not necessary for additional coils to be provided which, for example, are arranged in the rotor, for example, wound around the rotor section, since, according to the invention, the stator which is customary in an electric machine and to that extent is already present is energized for the purposes of inducing a magnetic flux in the superconducting material. In particular the retrofitting of known electric machines by means of the controller can thus also advantageously be provided. Furthermore, material and production costs can advantageously be reduced by saving on such additional coils.

The rotor may in particular also be referred to as the non-stationary part. The stator may in particular also be referred to as the stationary part. The superconducting material may in particular also be referred to as the bulk superconductor. A section may in particular also be referred to as an area and designates in particular a spatially contiguous area.

According to one embodiment, the electric machine may be fashioned in particular as a synchronous machine.

In another embodiment, the stator comprises one or more windings, in particular three windings, which in particular may comprise one or more coils through which the stator current can flow. The windings may in particular also be formed from a further superconducting material such that if the windings are appropriately cooled to below the transition temperature, the electric machine can be operated with particularly low losses.

In a further embodiment, a DC current source may be provided for energizing the stator, in particular the windings. DC stands here for "Direct Current". It may, for example, also be provided that the individual windings are each connected to their own DC current source. If the windings are connected in a star shape, one shared DC current source may preferably be provided for all the windings. The stator may, in particular, comprise a converter which is used for energizing a stator, so in this embodiment a further DC current source may also advantageously optionally be dispensed with. The controller preferably controls the aforementioned DC current sources and/or the converter. The controller may in particular be integrated in the converter. During magnetization, the windings are preferably energized together or in particular also independently of one another. In this way, a magnetic flux can be adjusted particularly precisely.

According to a further embodiment, the controller may furthermore be designed to control the stator current as a function of a temperature of the superconducting material. For example, it may be provided that the stator current is switched off once the rotor section has been cooled to below the critical temperature of the superconducting material. Since below the critical temperature no further penetration of a magnetic flux induced by means of the stator current is possible, further energization of the stator would produce no additional effect in this regard. Due to the switching off, energy is thus advantageously saved. The stator current is therefore used particularly efficiently. In particular, one or more temperature sensors may be provided for measuring the temperature.

According to one embodiment, it may be provided that the controller controls the stator current as a function of a measured rotor magnetic field. In particular, one or more magnetic field sensors, for example, Hall sensors, may be provided for measuring the rotor magnetic field. Since the rotor magnetic field is formed in particular by means of the magnetic flux in and/or through the superconducting material, said rotor magnetic field being for its part in turn induced by the generator current in the superconducting material, a certain rotor magnetic field suitable for a certain application or machine can thus advantageously be generated by controlling the stator current as a function of the measured rotor magnetic field.

In yet a further embodiment, it may be provided that the rotor comprises a pole core which can be cooled by means of a cooling fluid and on which the rotor segment is arranged. Cooling of the rotor section can thus advantageously be achieved via the pole core so as in particular to enable cooling of the superconducting material to below its critical temperature. The cooling fluid to be used will depend here in particular on the critical temperature of the superconducting material. For example, liquid nitrogen, liquid neon or liquid helium may be used for cooling the pole core. The pole core may be fashioned, for example, from a ferromagnetic material and will consequently advantageously contribute to the formation of a rotor magnetic field. A cooling fluid may for the purposes of the present invention be in particular a cooling gas or a cooling liquid.

According to one embodiment, a thermal connecting layer is fashioned between the pole core and the rotor section. A precisely defined thermal connection of the superconducting layer to the pole core is in this way advantageously enabled. The thermal connecting layer preferably has a predefined thermal conductivity such that transfer of thermal energy between the pole core and the rotor section can be adjusted precisely. For example, the rotor section may be thermally weakly connected to the pole core. This means, in particular that heating of the superconducting material results in little or no heating of the pole core. It may for example be provided that the thermal connecting layer comprises a thermal diode which essentially permits the transfer of thermal energy in one direction only. Such a thermal diode may for example be diamond, In another embodiment, a heater is arranged on the rotor section for heating to above the critical temperature of the superconducting layer. This advantageously makes it possible in particular to re-heat a rotor section that has already cooled to below the critical temperature to the extent necessary to enable the penetration of magnetic flux through the superconducting material such that as a consequence a corresponding rotor magnetic field forms. In this way, for example, the rotor magnetic field can advantageously be regenerated or modified even during operation of the electric field, in which case the rotor should not rotate. In particular, the magnetization period of the rotor can in this way also be limited to a short time as the rotor section is already cold and also remains cold. The rotor section is thus preferably firstly cooled to below the critical temperature and is only then magnetized by switching on the heater. For example, a short heat pulse is applied to the rotor section such that the rotor section is heated to a temperature above the critical temperature, where "above" for the purposes of the invention may generally mean in particular 30 K, in particular 20 K, for example 10 K, preferably 5 K above the critical temperature. Only then is a magnetic flux induced through the rotor section by energizing in particular the stator. The heater is then switched off. The period of magnetization, i.e. the period of time which is needed until the rotor section is magnetized is in this case substantially shorter than when a magnetic flux is induced in the rotor section at room temperature and then has to be cooled from room temperature to below the critical temperature. Thus, the stator can as a consequence advantageously be energized for a shorter time, which furthermore advantageously prevents or reduces any loading of the stator. This makes it possible for example advantageously to operate the stator for a short time at or above its load limit for magnetization, as the relevant period of time is as a rule still tolerable.

According to a further embodiment, the heater may be fashioned as a heating foil which is bonded in particular to the superconducting material. The provision of a heating foil also has in particular the advantage that even a large surface area of the superconducting material can be heated in a simple manner as a result.

According to one embodiment, the superconducting material may, for example, be a high-temperature superconducting material ($HT_cS$), where $T_c$ stands for the critical temperature. The simplified HTS is also used hereinbelow for $HT_cS$. The superconducting material may, for example, be $YBa_2Cu_3O_7$, $Bi_2Sr_2CaCuO_8$, $(BiPb)_2Sr_2Ca_2Cu_3O_{10}$ or magnesium diboride. In an HTS material, the critical temperature may for example be greater than or equal to 23 K.

According to yet a further embodiment, it may be provided that the rotor section is fashioned from one or more tiles made of the superconducting material. The tiles may for example be bonded in particular by means of an epoxy-resin adhesive. The tiles are preferably fashioned identically or differently.

In another embodiment, the controller may be fashioned in software and/or hardware. The controller may preferably be fashioned as a control unit.

In a further embodiment, a plurality of rotor sections may also be fashioned from a superconducting material. This plurality of rotor sections may in particular be arranged in opposing pairs such that they advantageously form opposite poles of a magnetic field. A number of rotor sections is in particular an even number, i.e. in particular divisible by two. For example, 4, 6, 8, 10 or 12 rotor sections may be fashioned such that advantageously an electric machine with a corresponding number of poles is formed. The rotor sections are fashioned for example identically or differently.

According to another embodiment, it may be provided that the rotor is arranged in a cryostat for thermal insulation. Particularly efficient and economic cooling of the rotor may advantageously be achieved in this way. In particular, the cryostat may be evacuated. The cryostat may preferably be part of the rotor or encompassed by the latter. That means in particular that the cryostat can co-rotate with the rotor during rotation of the rotor.

BRIEF DESCRIPTION OF THE DRAWING

The above-described characteristics, features and advantages of this invention and the way in which these are achieved will be more clearly comprehensible in connection with the description below of exemplary embodiments which are explained in detail in relation to the drawings, in which.

DETAILED DESCRIPTION OF PREFERRED EMBODIMENTS

Figure 1:
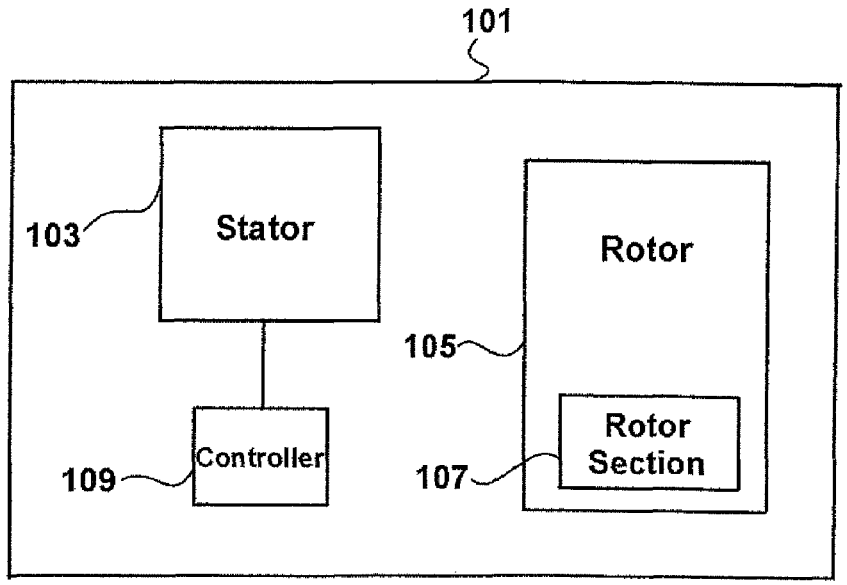
FIG. 1 shows an electric machine.

Identical reference characters are used below to denote identical features.

FIG. 1 shows an electric machine 101. The machine 101 comprises a stator 103 and a rotatably mounted rotor 105. The rotor 105 comprises a coolable and magnetizable rotor section 107 made of a superconducting material. Furthermore, a controller 109 is provided which controls energization of the stator 103 such that based on the stator current a magnetic flux is induced in the rotor section 107. Insofar as a temperature of the superconducting material lies above the critical temperature, a magnetic flux advantageously forms through the superconducting material. The rotor section 107 is consequently advantageously magnetized.

After magnetization, the rotor section 107 is cooled down to a temperature below the critical temperature such that the magnetic flux is advantageously fixed in the superconducting material, which advantageously forms a corresponding rotor magnetic field. If the controller 109 should now switch off the stator current of if the latter should fail due to a defect or power failure, then the magnetization of the rotor section 107 and thus also the rotor magnetic field will be retained as long as the temperature of the superconducting material lies below the critical temperature or transient temperature.

Figure 2:
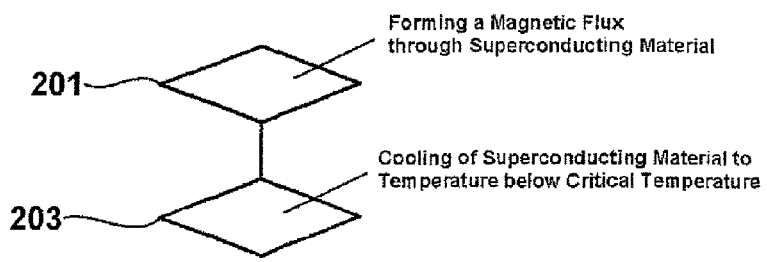
FIG. 2 shows a flow diagram of a method for operating an electric machine.

FIG. 2 shows a flow diagram of a method for operating an electric machine. The machine may for example be the machine 101 in FIG. 1.

In a step 201, a stator current which induces a magnetic flux in the superconducting material is controlled such that a magnetic flux forms through the superconducting material. In a step 203, the superconducting material is then cooled to a temperature below the critical temperature in order to fix the magnetic flux in the superconducting material. If the superconducting material already has a temperature below the transient temperature, it may in particular be provided that prior to energization of the stator the superconducting material is heated to a temperature above the transient temperature so as advantageously to enable penetration of the magnetic flux through the superconducting material.

Figure 3:
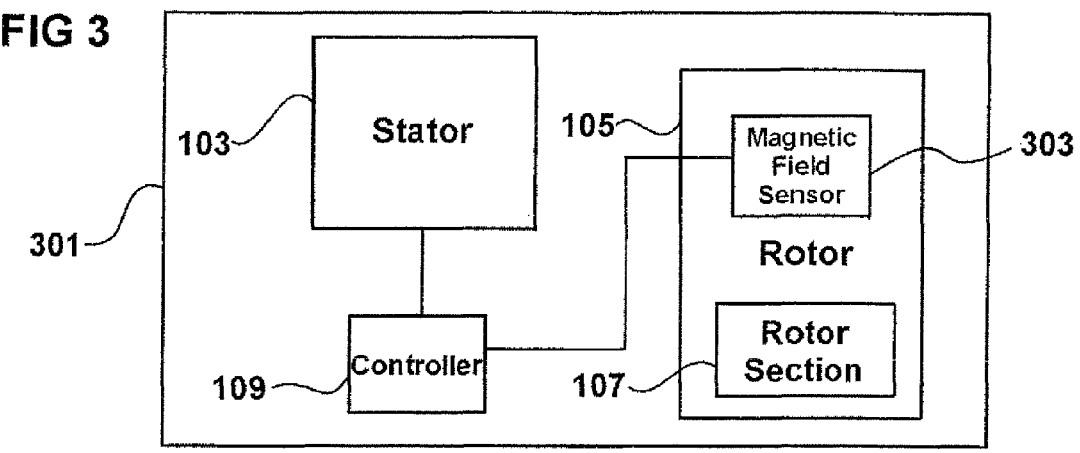
FIG. 3 shows a further electric machine.

FIG. 3 shows a further electric machine 301 which is fashioned analogously to the electric machine 101 in FIG. 1. In addition to the electric machine 101, the electric machine 301 has a magnetic field sensor 303 which is arranged in the rotor 105. The magnetic field sensor 303 may for example be a Hall sensor. The magnetic field sensor 303 advantageously makes it possible to measure the rotor magnetic field. This measurement value is transmitted to the controller 109 which then, depending on the measured rotor magnetic field, can control the current supply to the stator 103.

In an embodiment that is not shown, the electric machines 101 and 301 may comprise one or more DC current sources which can energize windings of the stator. The DC current sources are preferably controlled by means of the controller 109. It may in particular be provided in this case that the windings are energized together or independently of one another.

Figure 4:
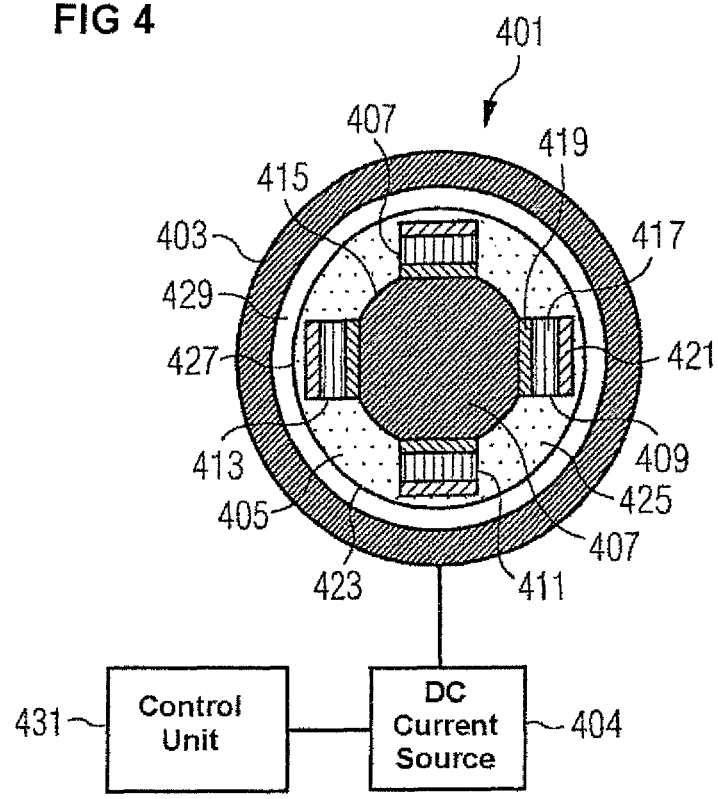
FIG. 4 shows a sectional view through another electric machine and FIG. 5 shows a flow diagram of a method for operating the electric machine shown in FIG. 4.

FIG. 4 shows a sectional view through another electric machine 401. The electric machine 401 comprises a stator 403 with stator windings (not shown). The stator windings are energized by means of a DC current source 404. Furthermore, the electric machine 401 comprises a rotor 405 arranged in the stator 403, said rotor comprising a pole core 407. The pole core 407 may be cooled by means of a cooling fluid, for example liquid helium, liquid nitrogen or liquid neon. The rotor 405 also has four magnetizable rotor sections 407, 409, 411 and 413, which are fashioned identically. The rotor sections 407, 409, 411 and 413 are each arranged offset with respect to one another on an external surface 415 of the pole core 407. Since the four rotor sections 407, 409, 411 and 413 are fashioned identically, the structure of the rotor section 409 will be described below. The corresponding structure of the rotor sections 407, 411 and 413 can be determined by analogy.

The rotor section 409 comprises a superconducting material 417 which is connected by means of a thermal connecting layer 419 to the external surface 415 of the pole core 407. The thermal connecting layer 419 has a specified thermal conductivity coefficient such that, when the superconducting material 417 is heated, the pole core 407 scarcely heats up or does so only negligibly. The thermal connection is in this respect in particular a weak thermal connection.

On a side of the superconducting material 417 facing away from the thermal connecting layer 419, a heating foil 421 is glued, for example by means of an epoxy-resin adhesive, said heating foil being able to heat the superconducting material 417 at least up to a temperature above the critical temperature. The superconducting material 417 is preferably fashioned as a superconducting tile which is connected to the pole core 407 via the connecting layer 419. The connecting layer 419 may for example be a thermal adhesive.

A cryostat 423 is also provided, the rotor being arranged in a cryostat interior 425 which can preferably be evacuated for the purposes of thermal insulation. Here, between a cryostat exterior wall 427 and the stator 403 a gap 429 is fashioned which can for example also be evacuated for thermal insulation purposes.

In an embodiment that is not shown, more than or fewer than four rotor sections may also be fashioned, for example two, six, eight, ten or twelve rotor sections, which are arranged in particular in opposing pairs on the external surface 415 of the pole core 407. The individual rotor sections of such a pair each form in particular a pole of a magnetic field.

The electric machine 401 comprises furthermore a control unit 431 which controls the DC current source 404 so as advantageously to enable control of the energization of the stator windings. Although not explicitly marked in FIG. 4, it may be provided that the control unit 431 also controls the electric heating foil 421.

Figure 5:
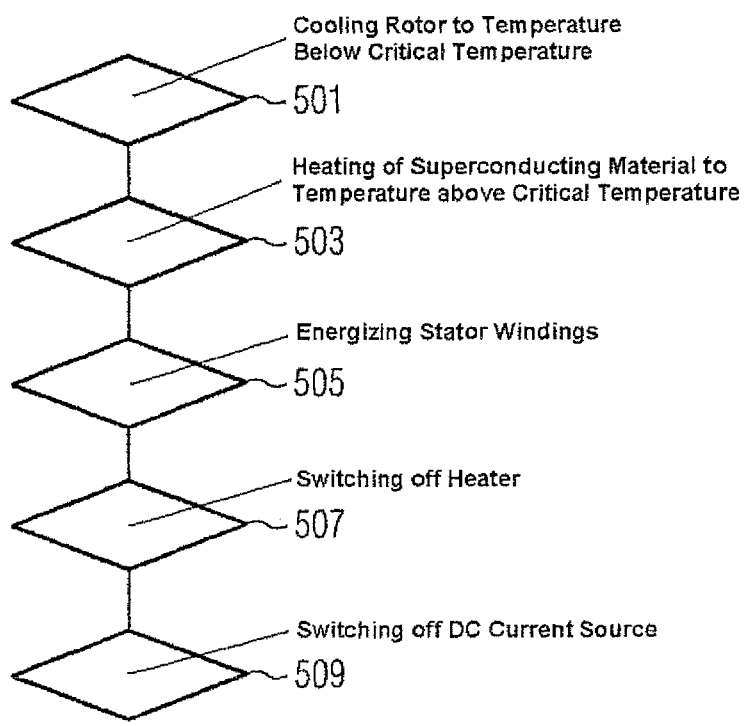

FIG. 5 shows a flow diagram of a method for operating the electric machine 401.

In a step 501, the rotor 407 is cooled down to a temperature below the critical temperature of the superconducting material 417 such that in particular the superconducting material 417 is itself also cooled to below the critical temperature. Then, in a step 503, the superconducting material 417 is, if necessary, heated up to a temperature above the critical temperature by means of the heating foil 421. Due to the weak thermal connection, the pole core 407 is not heated up or only negligibly. In particular, a dwell time of the superconducting material 417 at temperatures above the critical temperature is calculated to be appropriately short so as to prevent intense heating of the pole core 407.

In a step 505, the stator windings of the stator 403 are now energized by means of the DC current source 404. The stator current induces a magnetic flux in the superconducting material 417, the latter penetrating the superconducting material 417 and so magnetizing the superconducting material 417. After magnetization, in a step 507, the electric heating foil 421 is switched off such that the superconducting material cools down again to a temperature below the transient temperature. The cooling advantageously has the effect that the magnetic flux is frozen or fixed in the superconducting material 417. Therefore, once the temperature of the superconducting material 417 has fallen below the transient temperature, in a step 509 the DC current source 404 is switched off so that energization of the stator windings is switched off.

The method described in connection with the electric machine 404 in FIG. 4, comprising the steps 501 to 509, may in particular also be generalized, in particular insofar as the heating foil 421 does not exclusively have to be used to heat the superconducting material 417. In an embodiment that is not shown, other heating means, for example, heating elements, may also be provided. According to a further embodiment that is not shown, the stator 403 may comprise three windings, which are each preferably energized via their own DC current source, it alternatively also being possible in particular for a shared DC current source to be provided. According to another embodiment that is not shown, it may also be provided that the stator 403 has a converter, it then being possible for this converter to be used to energize the windings. Here, an additional DC current source can thus advantageously be dispensed with.

The invention therefore encompasses in particular the idea of using the stator, in particular its stator windings, for the purposes of appropriate energization to magnetize the superconducting material. This offers in particular the advantage that no additional coil or additional coils, which may be fashioned for example as an HTS coil, is/are needed for magnetization.

The absence of the need for such an additional coil means that the use of HIS conducting tapes, which are normally very expensive, can also be dispensed with. The manufacturing costs of the electric machine are advantageously reduced. At the same time, the technical input and time required for production are also reduced.

Furthermore, operational reliability is also increased as energization of additional coils and thus contactless energization of coils or slip rings is now no longer needed. This eliminates any corresponding risk of failure and maintenance input for these additional components.

Moreover, the cooling of the rotor is simplified substantially as no additional coils (with a potential quenching risk) have to be cooled. There are also no current feeds which have to be thermally trapped and cooled.

In addition, there is also no risk of HTS coils overheating or quenching and burning through, as no HTS coils are incorporated in the rotor. The superconducting material can thus advantageously not burn through. Such a rotor is substantially more reliable and cannot electrically be permanently destroyed.

Since rotor assembly generally takes place at a temperature above the critical temperature, the superconducting material is usually not yet magnetized, which enables easier assembly in comparison to permanently excited machines.

Dismantling, i.e. in particular removal of the rotor from the stator, is also more easily possible, as the rotor heats up after the cooling system has been switched off and as a result the superconducting material loses its magnetization when the stator current is switched off as soon as the temperature has risen above the critical temperature.

For particularly rapid dismantling, the rotor can be rapidly demagnetized in that the superconducting material, particularly when the stator current is switched off, can be heated to above the critical temperature for a short time by means of the heater.

After a malfunction, for example due to heating of the superconducting material as a result of prolonged failure of the cooling system, the rotor with the superconducting material can readily be re-magnetized after re-cooling and the electric machine started up.

When magnetizing the superconducting material, an existing converter may also be used to supply the stator windings or stator coils. Provision may be made in particular for the controller to be integrated in such a converter, for example as software.

Although the invention has been illustrated and described in detail by means of the preferred embodiments, the invention is not restricted by the disclosed examples, and other variations may be derived herefrom by a person skilled in the art without departing from the scope of protection of the invention.

The invention claimed is:

1. An electric machine, comprising:
   a stator;
   a rotatably mounted rotor having a plurality of coolable and magnetizable rotor sections made of a superconducting material;
   a controller configured to control a stator current for inducing a magnetic flux through the superconducting material;
   wherein the rotor sections are arranged in opposing pairs such that they form opposite poles of a magnetic field and each fashioned from one or more tiles made of the superconducting material; and
   a heater arranged on each of the rotor sections for heating the rotor section to a temperature above a critical temperature of the superconducting material.

2. The electric machine of claim 1, wherein the controller is configured to control the stator current as a function of a temperature of the superconducting material.

3. The electric machine of claim 1, wherein the controller is configured to control the stator current as a function of a rotor magnetic field.

4. The electric machine of claim 1, wherein the rotor comprises a pole core coolable by a cooling fluid, said rotor section being arranged on the pole core.

5. The electric machine of claim 4, further comprising a thermal connecting layer formed between the pole core and the rotor section.

6. The electric machine of claim 1, wherein the heater is formed as a heating foil.

7. A method for operating an electric machine including a stator and a rotatably mounted rotor having a plurality of coolable, magnetizable rotor sections made of a superconducting material, said method comprising:
   forming a magnetic flux through the superconducting material by controlling a stator current for inducing the magnetic flux in the superconducting material;
   cooling the superconducting material, after formation of the magnetic flux, to a temperature below a critical temperature of the superconducting material to fix the magnetic flux;
   arranging the rotor sections in opposing pairs such that they form opposite poles of a magnetic field and each fashioned from one or more tiles made of the superconducting material; and
   heating each of the rotor sections to a temperature above a critical temperature of the superconducting material by a heater provided on each of the rotor sections.

8. The method of claim 7, wherein the stator current is controlled as a function of a temperature of the superconducting material.

9. The method of claim 7, wherein the stator current is controlled as a function of a measured rotor magnetic field.

* * * * *